3,326,958
PROCESS FOR THE PREPARATION OF CARBONIC AND CARBOXYLIC ACID DERIVATIVES
Ulrich Curtius, Krefeld-Bockum, Volker Böllert, Hamburg, and Gerhard Fritz and Joachim Nentwig, Krefeld-Bockum, Germany, assignors to Farbenfabriken Bayer Aktiengesellschaft, Leverkusen, Germany, a corporation of Germany
No Drawing. Filed Mar. 16, 1966, Ser. No. 534,625
Claims priority, application Germany, May 25, 1961, F 34,010, Dec. 8, 1961, F 35,501
9 Claims. (Cl. 260—463)

The present invention relates to a process for the production of acid derivatives; more particularly it relates to a process for the production of esters and anhydrides of carbonic and carboxylic acids.

This application is a continuation-in-part application of our co-pending application Ser. No. 196,620, filed May 22, 1962, and now abandoned.

Heretofore, it was known that carbonate esters could be prepared by the reaction of phenols with phosgene. However, the reaction proceeds very slowly and produced low yields. In addition, it was known that amphoteric metals could be used as catalysts; however, it was difficult to remove traces of these metals from the final product. It was also known that high yields could be obtained from the reaction of phosgene and phenols in the presence of a tetramethyl ammonium halide catalyst.

Furthermore, it was known that acid derivatives, particularly esters and anhydrides of carbonic and carboxylic acids may be produced by reacting one mol of a carbonic acid halide or carboxylic acid halide with an organic hydroxy compound in such a ratio that one mol of the organic hydroxy compound is present for each halogen atom that is present in the halide in the presence of organic non-water-miscible solvents for the halides, a catalytic amount of a tertiary amine or a quaternization product thereof and an amount of an alkali metal or alkaline earth metal hydroxide or carbonate which is at least equivalent to the amount of hydrogen halide formed during the reaction. The state of the art is further illustrated in Boehm and Mehta, Berichte der Deutschen Chemischen Gesellschaft 71 B, 1797–1802 (1938), Wagner and Zook, Synthetic Organic Chemistry, pages 480–484 (1955), German patent specification 959,497, British patent specifications 808,490 and 843,314, French patent specification 1,169,802 and United States Patent 2,837,555.

It is, therefore, an object of this invention to provide an improved process for preparing acid derivatives, more particularly esters and anhydrides of carbonic and carboxylic acids in high yields. It is a further object of this invention to provide an improved process for such acid derivatives free of contamination.

The foregoing objects and others which will become apparent from the following description are accomplished in accordance with this invention, generally speaking, by providing in a process for the preparation of esters and anhydrides of carbonic and carboxylic acids by reacting 1 mol of carbonic acid halide or carboxylic acid halide with 1 mol for each halogen atom present in the halide of a hydroxy compound in the presence of water and an amount of a basic reactant such as an alkali metal or alkaline earth metal hydroxide or carbonate which is at least chemically equivalent to the amount of hydrogen halide formed during the reaction, an organic water immiscible solvent for said halides, and a basic catalyst such as a tertiary amine or quaternization product thereof, the improvement which comprises using a tertiary amine or quaternization product thereof having at least one ω-hydroxyalkyl, ω-hydroxyalkyl ether or ω-hydroxyalkyl polyether group connected to the nitrogen atom.

According to the present invention 1 mol of carbonic acid halide or carboxylic acid halide is reacted with 1 mol for each halogen atom present in the halide of a hydroxy compound in the presence of water, an organic water immiscible solvent for said halides, an amount of an alkali metal or alkaline earth metal hydroxide or carbonate which is at least chemically equivalent to the amount of hydrogen halide formed during the reaction, and a catalytic amount of a tertiary amine or quaternary ammonium product thereof having at least a ω-hydroxyalkyl or ω-hydroxyalkyl ether or ω-hydroxyalkyl polyether connected to the nitrogen atom. More particularly the tertiary amines which are to be applied as such or in the form of quaternary ammonium compounds obtainable therefrom in known manner by means of alkylating agents correspond to the formula

wherein at least one of the substituents, $R_1$, $R_2$ and $R_3$ represents a substituent selected from the group consisting of an ω-hydroxyalkyl, ω-hydroxyalkyl ether and ω-hydroxyalkyl polyether group, the alkyl radicals of which can be substituted, and the remaining substituents may represent substituents selected from the group consisting of substituted and unsubstituted alkyl, cycloalkyl, aralkyl and arylcycloalkyl radicals.

The presence of catalytic amounts of the tertiary amines or the quaternary ammonium compounds thereof during the reaction of the carbonic acid halides or carboxylic acid halides with the organic hydroxy compound has a profound effect on both the yield and purity of the esters and anhydrides thus formed.

The amount of catalyst needed will depend to a certain extent on the reaction rate desired and the rate of addition of the reactants. The amount of catalyst needed can easily be determined by preliminary tests; generally, from about 0.0005 to about 0.2 mols, preferably from about 0.001 to about 0.01 mol per mol of carbonic or carboxylic acid halide have proved to be sufficient.

Examples of tertiary amines which serve as catalysts in the process of the invention are N,N-dimethyl-ethanol amine, N-methyl,N-ethyl-ethanol amine, N-ethyl, N-butyl-ethanol amine, N,N-diethyl-ethanol amine, N-propyl, N-ethyl-ethanol amine, N,N-dimethyl-octanol amine, N,N-dimethyl-hexanol amine, N,N-dimethyl-butanol amine, N,N-dimethyl dodecanol amine, N,N-dioctyl-ethanol amine, N,N-dihexyl-ethanol amine, N,N-dibutyl-ethanol amine, N-methyl, N-propyl-propanol amine, N-ethyl, N-propyl-propanol amine, N-hexyl, N - propyl-propanol amine, N-octyl, N-propyl-propanol amine, N-methyl, N-butyl-butanol amine, N-ethyl, N-hexyl-hexanol amine, N-butyl, N-octyl-octanol amine, N-benzyl, N-ethyl-propanol amine, N-dimethylbenzyl, N-propyl-ethanol amine, N-tolyl, N-phenyl-octanol amine, N,N-diphenyl-hexanol amine, N - methyl-diethanolamine, N - propyl-diethanolamine, N-octyl-diethanolamine, N-dodecyl-diethanolamine, N-benzyl-diethanolamine, triethanolamine, tripropanolamine, tributanolamine, N,N-diethanol-propanolamine, N,N-dipropanol-ethanol amine, and so forth; the reaction products of ethylene oxide and/or propylene oxide with N,N-dimethyl-ethanolamine, triethanolamine, diisopropylamine, diisobutylamine, N-methyl-stearylamine, piperidine, N-methylcyclohexylamine, N-methyl-aniline or N-ethyl-aniline, furthermore the reaction products of styrene oxide and ethylene oxide or propylene oxide with, for example, diisobutanolamine. The molar ratio between oxide and amine may vary within a wide range, for example, between 1 and 20:1, preferably it is between 4 and 10:1.

Examples of quaternization compounds are N,N-dimethyl-N-octyl-ethanolammoniumchloride, N,N - diethyl-N - octyl - ethanolammoniumchloride, N,N - dipropyl-N-octyl - ethanol - ammoniumchloride, N,N-dibutyl-N-octyl-ethanolammoniumchloride, N-methyl- N-ethyl-N-octyl-ethanolammoniumchloride, N-methyl, N-propyl-N-octyl-ethanolammoniumchloride, N,N - dimethyl - N-octadecyl-ethanolammoniumchloride, N,N,N-trimethyl-octanol-ammoniumchloride, trimethyl-ethanolammoniumchloride, 1,2,3-tris-(2-diethyl-ethanolammoniumethoxy)-benzene triiodide, hexamethylene - bis - (dimethyl - hydroxyethylammoniumbromide), (2-acetoxypropyl) - dimethyl-hydroxyethylammoniumchloride, methyl - octyl - dimethyl-benzyl-hydroxyethylammoniumchloride, methyl-octyl-benzyl-hydroxyethylammoniumchloride, dimethyl - benzyl - ethanol-ammoniumchloride, dimethyl-benzyl-ethanol-ammoniumhydroxide and (2-hydroxyethyl)-trimethylammonium-bicarbonate.

Examples of carbonic acid halides which may be employed in this process for producing acid derivatives are phosgene, alkyl-, cycloalkyl-, aryl-, arylalkyl-, alkylaryl-, chloro- and bromo-carbonic acid ethers, which can also carry on the alkyl or aryl radicals other substituents such as halogen atoms or ether carboxylic acid ester and nitro and sulphonic acid ester groups for example, methyl-, trichloromethyl-, ethyl-, propyl-, butyl-, amyl-, isoamyl-, decyl-, stearyl-, cyclohexyl-, methyl-cyclohexyl-, phenyl-, cresyl-, 4-cyclohexyl-phenyl-, 4-chloro-phenyl-, 2,4-dichlorophenyl-, 4-cumyl-phenyl-, 2-decyl-phenyl-, 4-diphenyl-, 2-naphthyl-, benzyl-, -phenylethyl- and 4-chloro-benzyl-chloroformic acid esters, as well as polyhalocarbonic acid esters of polyhydroxy compounds, for example, the bis-chlorocarbonic acid ester of butane-1,4-diol, the bis-chlorocarbonic acid ester of hexane-1,6-diol, the trischlorocarbonic acid ester of trimethylol-propane, the bis-chlorocarbonic acid ester of hydroquinone, the bis-chlorocarbonic acid ester of 2,2-(4,4'-dihydroxy-diphenyl)-propane, the bis-chlorocarbonic acid ester of 4,4'-dihydroxy-diphenyl sulfide, the bis-chlorocarbonic acid ester of 4,4'-dihydroxy - diphenyl ether, 4,4'-dihydroxy - diphenyl sulphoxide, 4,4'-dihydroxy-diphenyl sulphone, the bis-chlorocarbonic acid ester of 1,4-dihydroxy-naphthalene, the bis-chlorocarbonic acid ester of α,α,α',α'-tetramethyl- α,α'-(di-p-hydroxyphenyl)-p-xylene, as well as low molecular weight polycarbonates with chlorocarbonic acid ester groups, for example, a polycarbonate made from bisphenol A with chlorocarbonic acid ester end groups.

Suitable carboxylic acid halides are the chlorides of aliphatic or aromatic carboxylic acids, such as, for example, acetic acid, propionic acid, acrylic acid, sebacic acid, benzoic acid, iso-phthalic acid and so forth.

Suitable hydroxy compounds which may be employed are, for example, aliphatic or aromatic saturated and unsaturated mono- and polyvalent alcohols, such as methanol, ethanol, allyl alcohol, butanol, isobutanol, decanol, stearyl alcohol, cyclohexanol, benzyl alcohol, phenol, cresol, xylenol, 2,4-dichlorophenol, beta-naphthol, 4-hydroxy-diphenyl, butane-1,4-diol, decane-1,4-diol, cyclohexane-1,4-diol, hydroquinone, resorcinol, dihydroxy-diaryl-alkanes, such as 2,2-(4,4'-dihydroxy-diphenyl)-propane, dihydroxy-triaryl-alkanes, dihydroxy-diphenyl ether, dihydroxy-diphenyl sulphide, as well as saturated and unsaturated mono- and polycarboxylic acids, such as acetic acid, butyric acid, stearic acid, acrylic acid, methacrylic acid, crotonic acid, hexahydrobenzoic acid, benzoic acid, benzoic per acid, 4-chlorobenzoic acid, naphthalene carboxylic acids, 4-diphenyl carboxylic acid, adipic acid, sebacic acid, terephthalic acid, isophthalic acid, 2,2-(4,4'-dicarboxyl-diphenyl)-propane, as well as mono esters of dicarboxylic acids, such as isophthalic acid monomethyl ester, and also hydroxybenzoic acid, 4-methoxy-benzoic acid, lactic acid ethyl ester, carbonic acid monoethyl ester, and also polymeric compounds which contain hydroxyl or carboxyl groups as end groups and/or as side groups, such as polyesters with carboxyl or hydroxyl end groups or side groups, polyvinyl alcohol and its derivatives, and polyethers with free hydroxyl groups; polycarboxylic acid-carbonic acid ester anhydrides produced therefrom, and so forth.

Depending on the type of compounds which are reacted together for example in carbon tetrachloride or benzene, monomeric carbonic acid esters, pyrocarbonic acid esters or carboxylic acid esters, furthermore polycarbonates, polypyrocarbonic esters, polyesters of polyvalent alcohols or polyvalent phenols with monocarboxylic acids, polyesters of polycarboxylic acids with mono- or polyvalent alcohols or monovalent or polyvalent phenols, carboxylic acid anhydrides, carbonic acid-carboxylic acid anhydrides, polycarboxylic anhydrides and polycarboxylic-carbonic acid anhydrides are obtained.

As acid binding agents there can be used, for example, sodium hydroxide solution, potassium hydroxide solution, potassium carbonate, sodium carbonate, potassium bicarbonate, sodium bicarbonate, calcium hydroxide and barium hydroxide.

The carbonic acid halides or carboxylic acid halides can be reacted with the hydroxy compounds in the presence of the tertiary amine catalysts according to the present invention by known processes. In many cases, it is advantageous to add inert organic solvent, such as methylene chloride, chloroform, carbon tetrachloride, chlorobenzene, benzene, toluene or dibutyl ether or, for example, to add the halides, dissolved in such a solvent, to the other reaction components. In order to avoid an excessive increase of temperature during the reaction, the reaction mixture can be cooled and one of the reaction components can be added portionwise.

In addition, the organic hydroxy compound which is to be reacted with the carbonic or carboxylic acid halide may be formed in the reaction mixture by saponifying a portion of the carbonic or carboxylic acid halide used.

The reactions can be carried out at temperatures between about −20 and +100° C. and preferably at temperatures between about 10 and 50° C. Depending on the nature of the reaction components and the nature and amount of the added catalyst, the reaction time lies between a few minutes and several hours. The progress of the reaction can easily be followed, for example, by the quantitative determination of the chloride ion content in the aqueous phase.

The rapid ending of the reaction, which is brought about by the catalysts according to the present invention, permits the production of the acid derivatives in a technically simple and economically advantageous manner.

The process can be carried out discontinuously in ordinary stirring vessels or can take place continuously in that the reaction mixture is passed, for example, through a tube or through one or more serially arranged mixing aggregates, such as stirring vessels; in this case, it is advantageous to add one of the reaction components in several parts at different points of the continuous stream in order to avoid too high an increase of temperature at any point due to the liberated heat of reaction.

After separation of the aqueous phase, the working up of the reaction mixture can take place in the usual manner, depending on the nature and physical properties of the low molecular weight products, for example, by distillation, crystallization or precipitation by the addition of non-solvents, and, in the case of high molecular weight products, for example, by filtration or evaporation of the solvents which may be present. If desired, the solutions of high molecular weight compounds, after washing, can be worked up directly to give formed bodies, such as foils and threads.

For the production according to the present invention of the different acid derivatives using the catalysts in question the reaction conditions are advantageously adapted to the reaction components in question and to the properties of the end products obtained. For the production of low molecular weight diesters of carbonic acid or of high molecular weight polycarbonates, it is advantageous, for example, to start with the mono- or polyhydroxy compound, together with the catalyst and the acid-binding agent, in the presence of water and possibly in the presence of a solvent, and to introduce phosgene or add the mono- or polyhalocarbonic acid ester, with stirring, to the reaction mixture or to add the phosgene or the halocarbonic acid ester, dissolved in a solvent, to the reaction mixture. The reaction products obtained either precipitate out from the reaction mixture or dissolve in the solvent which may be present and can thus be separated from the aqueous phase and be worked up. It is often advantageous not to add the whole amount of catalyst at the beginning of the reaction but to wait until the reaction has reached a certain stage. As a general rule the reaction of the halides with the mono- or polyhydroxy compounds proceeds more rapidly at high pH values; however, it must be borne in mind that at a high pH value the saponification of the halides also increases.

The production of carboxylic acid-carbonic acid ester anhydrides using the catalysts according to the invention preferably takes place in the pH range between about 5.5 and about 8.5. For example, the salts of mono- or polycarboxylic acids are dissolved or suspended in water and, at a pH of 5.5 to 8.5 in the presence of the catalysts according to the invention, reacted with the mono- or polyhalocarbonic acid esters in substance or dissolved in an inert solvent. The working up of the carboxylic acid-carbonic acid ester anhydrides obtained then takes place in the usual manner.

For the production of pyrocarbonic acid esters, it is advantageous to start with 0.9 to 2 mol, preferably 1.0 to 1.2 mol, of halocarbonic acid ester, together with the catalyst, preferably dissolved in a suitable inert solvent, and one mol of an aqueous solution or suspension of the acid-binding agent introduced, with stirring. In order to prevent an excessive increase of temperature during the rapidly proceeding reaction, the reaction mixture can be cooled or the aqueous solution or suspension of the acid-binding agent can be added suitably slowly or portionwise. After the whole of the acid-binding agent has been added, the mixture is, if necessary, further stirred until the reaction is finished.

The working up of the reaction mixture then takes place, after the separation of the aqueous phase, for example, by distillation, or when the pyrocarbonic acid ester can be obtained in crystalline form, by cooling the solution or by precipitation by the addition of a non-solvent. In general, the pyrocarbonic esters obtained are so pure that further purification, for example, by redistillation or recrystallization, is unnecessary.

The process of the present invention provides the following advantages, namely, the reaction speed is increased, the yields are higher and in cases where the reaction products are to be purified by distillation, the catalysts are not carried over into the distilled product and therefore do not contaminate the reaction products. This is particularly important in the preparation of pyrocarbonic diethyl ester.

This invention can be further illustrated by the following examples showing preferred embodiments, although it will be understood that these embodiments are included merely for purposes of illustration and are not intended to limit the scope of the invention unless otherwise specifically indicated.

*Example 1*

A mixture of 23.5 g. (0.25 mol) of phenol, 23.1 g. (0.275 mol) of sodium bicarbonate, 150 ml. of water, 50 ml. of methylene chloride and 0.13 g. (0.00025 mol) of the reaction product of 4 mol of propylene oxide with 1 mol of N-methyl stearyl amine is mixed dropwise with 39.0 g. (0.25 mol) of chlorocarbonic acid phenyl ester while stirring within 5 minutes, the temperature being kept at 20° C. The carbon dioxide evolved in the reaction is collected over saturated sodium chloride solution. The reaction is complete when the gas volume no longer increases within 10 minutes. This happens after 60 minutes. The organic layer is then separated from the aqueous layer, the solvent is substantially distilled off under atmospheric pressure and the residue is distilled under water pump vacuum. The resulting diphenyl carbonate distills over at a boiling point of 163–168° C. under 15 mm./Hg; the yield is 50.3 g.

When using in the aforesaid reaction, instead of 0.00025 mol of the reaction product of 4 mol of propylene oxide with 1 mol of N-methyl stearyl amine, 0.00025 mol (0.16 g.) of the reaction product of 8 mol of ethylene oxide with 1 mol of N-methyl stearyl amine and proceeding under otherwise equal conditions, the reaction is complete after 55 minutes and the yield of diphenyl carbonate is 52.5 g., whereas when using 0.00025 mol (0.46 g.) of tributyl amine, the reaction is complete only after 170 minutes and the yield is 45.2 g. only.

*Example 2*

A mixture of 23.5 g. (0.25 mol) of phenyl, 8.8 g. (0.22 mol) of sodium hydroxide, 5.8 g. (0055 mol) anhydrous sodium carbonate, 100 ml. of water, 100 ml. of methylene chloride and 0.13 g. (0.00025 mol) of the reaction product of 4 mol of propylene oxide with 1 mol of N-methyl stearyl amine is mixed dropwise within 5 minutes while stirring with 39.0 g. (0.25 mol) of chloro carbonic acid phenyl ester, the temperature being kept at 25° C. Stirring is then interrupted and a 1 ml. sample is taken from the aqueous layer formed, diluted with distilled water up to 100 ml. and titrated with 1 $n/10$ silver nitrate solution. Stirring is continued and interrupted at time intervals of 10 minutes each for taking further samples. The reaction is complete when the consumption of the silver nitrate solution no longer increases. This occurs after 35 minutes. The reaction mixture is subsequently worked up as described in Example 1. The yield of diphenyl carbonate is 51.2 g.

When using in the above described reaction, instead of 0.00025 mol of the reaction product of 4 mol of propylene oxide with 1 mol of N-methyl stearyl amine, 0.00025 mol of the reaction product of 8 mol of ethylene oxide with 1 mol of N-methyl stearyl amine and proceeding otherwise as described above, the reaction is complete after 20 minutes and the yield of diphenyl carbonate is 51.2 g.

When using 0.00025 mol of tributyl amine, the reaction is complete only after 55 minutes; the yield is 50.3 g., but the nitrogen content in the distillate is 2.8 mg. and in the distillation residue 0.3 mg. In contrast thereto any nitrogen cannot be detected in the distillate when using the reaction product of ethylene oxide or propylene oxide with N-methyl stearyl amine, and the nitrogen content in the distillation residue in this case is 3.2 mg. each.

*Example 3*

A mixture of 18.5 g. (0.25 mol) of n-butyl alcohol, 100 g. of sdoium hydroxide solution (12%), 65 g. of methylene chloride and 0.16 g. (0.00025 mol) of the reaction product of 8 mol of ethylene oxide with 1 mol of N-methyl stearyl amine is reacted dropwise while stirring with a solution of 40.8 g. (0.27 mol) of chlorocarbonic acid-n-butyl ester (92%) in 30 g. of methylene chloride, the temperature being kept at 5–10° C. The reaction the course of which can be observed by determining the chlorine ion content of the aqueous layer is complete after 50 minutes. The organic layer is then separated from the aqueous layer, the solvent is substantially distilled off under atmospheric pressure and the residue is distilled under water pump vacuum. The yield of dibutyl carbonate is 37.2 g.; this corresponds to 85.5% of the theoretical referred to butyl alcohol.

When using 0.00025 mol of tributyl amine, instead of 0.00025 mol of the reaction product of 8 mol of ethylene oxide with 1 mol of N-methyl stearyl amine, the reaction is complete only after 190 minutes and the yield of dibutyl carbonate is only 30.2 g. corresponding to 69.4% of the theoretical referred to butyl alcohol.

When using instead of the reaction product of 8 mol of ethylene oxide with 1 mol of N-methyl stearyl amine, the reaction product of 2 mol of ethylene oxide with 1 mol of N-methyl stearyl amine or the reaction product of 1 mol of ethylene oxide with 1 mol of N-methyl dodecyl amine, dibutyl carbonate is obtained in likewise very good yield.

*Example 4*

A solution of 41.6 g. (0.25 mol) of isophthalic acid, 20.0 g. (0.5 mol) of sodium hydroxide and 250 ml. of water is added within 1 minute with stirring to a solution of 67.8 g. (0.6 mol) of 96% chlorocarbonic acid ethyl ester in 140 g. of methylene chloride containing 1.07 g. (0.002 mol) of the reaction product of 4.3 mol propylene oxide with 1 mol of N-methyl-stearylamine. The temperature of the reaction mixture is maintained at 18–20° C. by cooling with ice, and stirring is continued for a further 20 minutes. The chlorine ion content of the aqueous phase then amounts to 18.5 g. Thereafter the two phases are separated in a separating funnel, and the aqueous phase is shaken out with 100 ml. methylene chloride. The two methylene chloride phases are combined, washed six times with 100 ml. of water and finally dried over anhydrous sodium sulphate. The methylene chloride and excess chlorocarbonic acid ethyl ester are evaporated off at 20° C. under water pump vacuum. 69.4 g. of a colourless, solid substance remain from which residues of chlorocarbonic acid ethyl ester are removed by washing with low boiling petroleum ether. 64.3 g. is isophthalic acid-bis-carbonic acid ethyl ester anhydride are then obtained; this corresponds to a yield of 82.9% of theory, referred to isophthalic acid.

Solidification point: 23–24° C.
$C_{14}H_{14}O_8$ molecular weight: 310.27
C calculated: 54.20%; found: 54.32–54.40%
O calculated: 41.26%; found: 41.20–41.30%
$CO_2$ after saponification: calculated: 28.27%; found: 28.6%

If instead of 0.002 mol of the reaction product of 4.3 mol of propylene oxide with 1 mol of N-methyl-stearylamine 0.005 mol (0.64 g.) of N,N-dimethyl-cyclohexylamine are applied the chlorine ion content of the aqueous phase amounts to not more than 9.4 g. even after 120 minutes. By working up the reaction mixture in the usual manner only 13.3 g. of the isophthalic acid-bis-carbonic acid ethyl ester anhydride are obtained; this corresponds to a yield of 17.4% of theory, referred to isophthalic acid.

*Example 5*

A mixture of 94 g. (1.0 mol) of phenol, 150 g. of methylene chloride, 1.3 g. (0.002 mol) of the reaction product of 8 mol of ethylene oxide with 1 mol of N-methyl stearyl amine and 600 g. of an aqueous solution containing 32 g. (0.8 mol) of sodium hydroxide and 24.4 g. (0.23 mol) of sodium carbonate is mixed dropwise within 5 minutes while stirring with a solution of 119 g. (1.1 mol) of chlorocarbonic acid ethyl ester in 75 g. of methylene chloride, the temperature being kept at 20° C. by cooling with a mixture of ice and water. The reaction the course of which observed as described in Example 2 is complete after 12 minutes. The reaction mixture is then worked up as described in Example 1. The yield of ethyl phenyl carbonate (B.P. 107° C.; 14 mm./Hg) is 162 g.

When using instead of the aforesaid reaction product, 0.002 mol (1.35 g.) of the reaction production of 10 mol of propylene oxide with 1 mol of N,N-dimethyl ethanol amine or 0.002 mol (1.66 g.) of the reaction product of 1 mol. of styrene oxide and 10 mol of propylene oxide with 1 mol of diisobutyl amine, the reaction is complete after 25 minutes in each case and the yields amount to 161.5 g. and 159 g. respectively.

When using 0.002 mol (0.37 g.) of tributyl amine the reaction is complete after 50 minutes only, the yield is 149 g.

*Example 6*

Solutions are prepared from 118.7 g. (1.05 mol) each of chlorocarbonic acid ethyl ester (96%) and 110 g. of methylene chloride with one of the tert. amines listed in the following Table I under (a)–(f) in the amount indicated therein. To each solution there is added dropwise with stirring and cooling to 18–22° C. a solution of 40 g. (1 mol) of sodium hydroxide in 560 ml. of water within 1 hour. After determining the chlorine ion content of the aqueous layer, the methylene chloride layer is separated from the aqueous layer and the aqueous layer is shaken out with 100 ml. of methylene chloride. The two methylene chloride solutions are combined and dried over anhydrous sodium sulphate. The methylene chloride is distailled off under atmospheric pressure up to a bath temperature of 60° C. and the residue is distilled under a water pump vacuum. A cooling trap containing solid carbon dioxide and methanol is provided behind the distillation receiver. At a bath temperature of 60° C. residues of methylene chloride, unreacted chlorocarbonic acid ethyl ester and diethyl carbonate distil over; thereafter the bath temperature is increased to 100–105° C. Then the pyrocarbonic acid diethyl ester distils over at a boiling point of 83–84° C. at 11 mm./Hg substantially without a residue and is collected in the distillation receiver.

TABLE I

| Catalyst | Catalyst G. | Mol | Chlorine ion content of the aqueous phase after the addition of the whole sodium hydroxide solution, g. | Recovered chlorocarbonic acid ethyl ester, g. | Yield of carbonic diethyl ester, g. | Yield of distilled pyrocarbonic acid diethyl ester, g. | Percent pyrocarbonic acid diethyl ester (distilled) referred to sodium hydroxide solution used |
|---|---|---|---|---|---|---|---|
| (a) Reaction product of 8 mol of ethylene oxide with 1 mol of N-methyl-stearylamine | 1.27 | 0.002 | 35.8 | 3.0 | 0.9 | 78.9 | 97.3 |
| (b) Reaction product of 4 mol of ethylene oxide with 1 mol of N-methyl-stearylamine | 0.92 | 0.002 | 35.1 | 2.5 | 1.2 | 75.4 | 93.0 |
| (c) Reaction product of 4.3 mol of propylene oxide with 1 mol of N-methyl-stearylamine | 1.07 | 0.002 | 34.9 | 2.4 | 1.4 | 77.3 | 95.3 |
| (d) Reaction product of 9.7 mol of propylene oxide with 1 mol of N-methyl-stearylamine | 1.69 | 0.002 | 35.6 | 3.0 | 1.3 | 78.7 | 97.1 |
| (e) Reaction product of 9.9 mol of propylene oxide with 1 mol of N,N-dimethyl-ethanolamine | 1.99 | 0.003 | 35.3 | 3.1 | 2.0 | 72.8 | 89.9 |
| (f) Reaction product of 19.9 mol of propylene oxide with 1 mol of N,N-dimethyl-ethanolamine | 3.73 | 0.003 | 35.7 | 3.2 | 1.9 | 73.4 | 90.5 |

The content of chlorocarbonic acid ethyl ester and diethyl carbonate in the pre-runnings, collected in the cooling trap, is determined gas chromatographically. The proportion of diethyl carbonate in the pyrocarbonic acid ester is determined by infra-red spectrum; it is always below 0.5%. The results are listed in Table I above.

When instead of the tertiary amines (a)–(f) of the Table I to be used according to the invention, tertiary amines of the nature disclosed in the prior art are applied as catalysts the results obtained are inferior as can be seen from the following Table II.

Example 9

124.4 g. (1.1 mol) of chlorocarbonic acid ethyl ester (96%) and 0.64 g. (0.001 mol) of the reaction product of 8 mol of ethylene oxide with 1 mol of N-methyl-stearyl-amine are dissolved in 150 g. of toluene and the solution is mixed while stirring and cooling to 20° C. within 1 hour with a solution of 40 g. (1 mol) of sodium hydroxide in 540 ml. of water. The organic phase is then separated off and dried over anhydrous sodium sulphate. The toluene is distilled off under water pump vacuum until the bath tem-

TABLE II

| Catalyst | Catalyst G. | Catalyst Mol | Chlorine ion content of the aqueous phase after the addition of the whole sodium hydroxide solution, g. | Recovered chlorocarbonic acid ethyl ester, g. | Yield of carbonic diethyl ester, g. | Yield of distilled pyrocarbonic acid diethyl ester, g. | Percent pyrocarbonic acid diethyl ester (distilled) referred to sodium hydroxide solution used |
|---|---|---|---|---|---|---|---|
| (a) N,N-dimethyl-aniline | 1.21 | 0.01 | 16.0 | 52.6 | 2.2 | 11.8 | 14.6 |
| (b) N,N-dimethyl-cyclohexyl-amine | 1.28 | 0.01 | 21.2 | 42.9 | 2.4 | 14.7 | 18.1 |
| (c) Triethylbenzyl ammonium-chloride | 2.05 | 0.01 | 17.7 | 52.0 | 2.5 | 12.3 | 15.2 |

Example 7

Solutions prepared from 118.7 g. (1.05 mol) each of chlorocarbonic acid ethyl ester (96%) and 110 g. of methylene chloride are mixed with 1.27 g. (0.002 mol) of the reaction product of 8 mol of ethylene oxide with 1 mol of N-methyl stearyl amine. To each solution there is added dropwise with stirring and cooling to 18–22° C. within 1 hour and at constant speed a solution of 40 g. (1 mol) of sodium hydroxide in 560 ml. of water, or a solution of 53 g. (0.5 mol) of sodium carbonate in 547 ml. of water or a solution of 84 g. (1 mol) of sodium bicarbonate in 816 ml. of water. The reaction mixtures are then worked up as described in Example 6. The results are listed in the table below.

perature has reached 50° C. The bath temperature is then raised to 105° C. After 3.6 g. of pre-runnings the resulting pyrocarbonic acid diethyl ester distills over at 83–84° C. under 11 mm./Hg substantially without a residue. 77 g. are obtained; this corresponds to a yield of 95% referred to the sodium hydroxide solution used. The content of diethyl carbonate is 0.5% in accordance with the infrared spectrum.

Example 10

A solution of 64.5 g. (0.6 mol) of chlorocarbonic acid methyl ester (88%) in 100 g. of methylene chloride is initially mixed with 0.16 g. (0.00025 mol) of the reaction product of 8 mol of ethylene oxide with 1 mol of N-

TABLE III

| Acid-binding agent | Chlorine ion content of the aqueous phase after the complete addition of the acid-binding agent, g. | Yield of distilled pyrocarbonic acid diethyl ester, g. | Yield of distilled pyrocarbonic acid diethyl ester in percent, referred to equivalents of acid binding agent |
|---|---|---|---|
| Sodium hydroxide | 36.0 | 76.3 | 94.1 |
| Sodium carbonate | 35.2 | 71.8 | 88.6 |
| Sodium bicarbonate | 35.4 | 69.5 | 85.7 |

Example 8

124.4 g. (1.1 mol) of chlorocarbonic acid ethyl ester (96%) are mixed with 1.27 g. (0.002 mol) of the reaction product of 8 mol of ethylene oxide with 1 mol of N-methyl stearyl amine. To the mixture there is added with stirring in the course of 20 minutes a solution of 40 g. (1 mol) of sodium hydroxide in 540 ml. of water. The temperature of the mixture is kept at 18–20° C. by cooling with a mixture of ice and sodium chloride. After the sodium hydroxide solution has completely been added the amount of chlorine ions in the aqueous phase is determined; an amount of 36.1 g. is obtained. The organic phase is then separated off, dried over anhydrous sodium sulphate and distilled under water pump vacuum. After 4.6 g. of pre-runnings which consist mainly of chlorocarbonic acid ethyl ester the pyrocarbonic acid diethyl ester distills over almost without residue at a boiling point of 83–84° C. at 11 mm./Hg. The yield of pyrocarbonic acid diethyl ester amounts to 76.6 g.; this corresponds to 94.6% of theory, referred to the amount of sodium hydroxide solution.

$C_6H_{10}O_5$ molecular weight: 162.15
C calculated: 44.44%; found: 44.60–44.63%
O calculated: 49.34%; found: 49.25–49.31%
$CO_2$ content after saponification: calculated: 54.27%; found: 54.2–54.4%
Content of diethyl carbonate by infra-red spectrum: 0.5%.

methyl-stearyl amine. A solution of 20 g. (0.5 mol) of sodium hydroxide in 280 ml. of water is added dropwise to the solution while stirring within 10 minutes, the temperature of the mixture being maintained at 18–22° C. while cooling with a mixture of ice and sodium chloride. After the sodium hydroxide solution has been added the chlorine ion content of the aqueous layer is determined; 17.9 g. are obtained. The methylene chloride layer is then separated from the aqueous layer and the aqueous layer is shaken out with 100 ml. of methylene chloride. The two methylene chloride solutions are combined, dried over anhydrous sodium sulphate and filtered between fuller's earth after filtering off the sodium sulphate. The methylene chloride is distilled off under atmospheric pressure up to a bath temperature of about 50° C. The bath temperature is then raised up to 90° C. After 3 g. of pre-running the resulting pyrocarbonic acid dimethyl ester distills over under water pump vacuum at boiling point of 71–72° C. and 11 mm./Hg substantially without a residue; 29 g. are obtained; this corresponds to a yield of 86.5% referred to the sodium hydroxide solution used.

$C_4H_6O_5$ molecular weight: 134.09
C calculated: 35.83%; found: 35.91–36.02%
O calculated: 59.66%; found: 59.31–40%
$CO_2$ after saponification: calculated: 65.63%; found: 65.5–65.6%

Example 11

A solution of 75.2 g. (0.55 mol) of chlorocarbonic acid butyl ester in 130 g. of methylene chloride is initially mixed with 0.64 g. (0.001 mol) of the reaction product of 8 mol of ethylene oxide with 1 mol of N-methyl stearyl amine, 300 g. of a solution of 20 g. (0.5 mol) of sodium hydroxide in 280 ml. of water are then added dropwise to the solution at 18–22° C. within 1 hour while stirring. The chlorine ion content of the aqueous layer is then determined; 17.7 g. are obtained. The reaction mixture is subsequently worked up as described in Example 6.

After distilling off the residues of methylene chloride and chlorocarbonic acid under water pump vacuum up to a bath temperature of 70° C., distillation is contained at a pressure of 0.1 mm./Hg. After 4 g. of pre-runnings the resulting pyrocarbonic acid dibutyl ester distills over at boiling point 66° C. and 0.1 mm./Hg substantially without a residue; 50.9 g. are obtained; this corresponds to a yield of 93.2% referred to the sodium hydroxide solution used.

Example 12

71.6 g. of phosgene are introduced into a mixture of 137.6 g. (0.6 mol) of 2,2-(4,4'-dihydroxy-diphenyl)-propane, 680 g. of water, 84 g. of sodium hydroxide and 250 g. of methylene chloride while stirring within 115 minutes, the reaction temperature being kept at 20–25° C. The mixture is then mixed with a solution of 0.38 g. (0.0006 mol) of the hydroxyethylated N-methyl stearyl amine (which is used in Example 11), in 8 g. of methylene chloride and stirred for a further 10 minutes. The resulting viscous solution of the polycarbonate formed is washed until free from electrolytes and the solvent is evaporated off. There is obtained a polycarbonate with a relative viscosity of 1.356 (measured in a 0.5% methylene chloride solution) which can be worked up from a solution or a melt to high-quality moldings.

Example 13

147.7 g. (1.05 mol) of benzoyl chloride, 74.1 g. (1 mol) of n-butanol and 1.5 g. (0.002 mol) of the reaction product of 8 mol of propylene oxide with 1 mol of N-methyl stearyl amine are dissolved in 400 g. of methylene chloride and the solution is mixed while stirring with a solution of 40 g. (1 mol) of sodium hydroxide in 460 ml. of water, the temperature of the reaction mixture being kept at 20° C. by cooling with ice. After the addition of the entire quantity of sodium hydroxide solution, the chloride ion content of the aqueous layer is 35.4 g. The methylene chloride layer is subsequently separated off from the aqueous layer, washed three times with water and then dried over anhydrous sodium sulphate. After evaporation of the methylene chloride there are obtained 169.5 g. of crude benzoic acid butyl ester from which 146.8 g. of pure benzoic acid butyl ester of a boiling point 115° C. under 7 mm./Hg are obtained upon distillation under vacuum. This corresponds to a yield of 82.4% referred to the butanol used.

When using instead of the tert. amine to be used according to the invention, 0.37 g. (0.002 mol) of tributyl amine as catalyst, the chloride ion content of the aqueous layer is only 26.8 g. upon the addition of the entire quantity of sodium hydroxide solution and only 101.3 g. of pure benzoic acid butyl ester of the boiling point 118–119° C. under 8 mm./Hg are obtained after working up the reaction mixture in the manner described above. This corresponds to a yield of 56.9% referred to the butanol used.

Example 14

A solution of 72.1 g. (0.5 mol) of sodium benzoate in 250 ml. of water is mixed within 5 minutes while stirring with a solution of 77.3 g. (0.55 mol) of benzoyl chloride and 0.75 g. (0.001 mol) of the reaction product of 8 mol of propylene oxide with 1 mol of N-methyl stearyl amine in 200 g. of methylene chloride, the temperature of the reaction mixture being kept at 20° C. by cooling with ice water. Immediately after combining the two solutions the chlorine ion content of the aqueous layer is 10.4 g.; after another 5 minutes, traces only of sodium benzoate can be detected; the theoretical chlorine ion content of 17.8 g. has then been reached. The methylene chloride layer is subsequently separated off, washed three times with water and dried over anhydrous sodium sulphate. After evaporating the methylene chloride there are obtained 106.8 g. of crude benzoic anhydride from which 10.4 g. of pure benzoic anhydride of the boiling point 121° C. at 0.05 mm./Hg and of the melting point 240° C. are obtained upon distillation in vacuum; this corresponds to a yield of 91.8% referred to the sodium benzoate used.

When using instead of the tert. amine to be used according to the invention, 0.51 g. (0.004 mol) of N,N-dimethyl cyclohexylamine as catalyst, the chlorine ion content of the aqueous layer is only 6.4 g. immediately after combining the solutions. The theoretical value is obtained only after 1 hour. Upon working up the reaction mixture as described above there are obtained 95.6 g. of pure benzoic anhydride of the boiling point 127° C. at 0.1 mm./Hg and the melting point 41–42° C.; this corresponds to a yield of 84.6% referred to the sodium benzoate used.

Example 15

A solution of 154.6 g. (1.1 mol) of benzoyl chloride and 0.64 g. (0.001 mol) of the reaction product of 8 mol of ethylene oxide with 1 mol of N-methyl stearyl amine in 200 g. of methylene chloride is mixed dropwise within 30 minutes while stirring with a solution of 40 g. (1 mol) of sodium hydroxide in 560 ml. of water, the temperature of the reaction mixture being kept at 20° C. by cooling with ice. After addition of the entire amount of sodium hydroxide solution the chlorine ion content of the aqueous layer is 35.8. The methylene chloride layer is then separated off, washed three times with water and dried over anhydrous sodium sulphate. After evaporation of the methylene chloride there are obtained 110 g. of crude benzoic anhydride from which 107 g. of pure benzoic anhydride of the boiling point 125° C. under 0.08 mm./Hg and the melting point 42° C. are obtained by distillation in vacuum; this corresponds to a yield of 94.5% referred to the sodium hydroxide solution used.

When using instead of the tert. amine to be used as catalyst according to the invention, 0.4 g. (0.004 mol) of triethyl amine, the chlorine ion content of the aqueous layer is 21.7 g. immediately after the addition of the entire amount of sodium hydroxide solution; even if the reaction mixture is stirred at 20° C. for a further 30 minutes the chlorine ion content increases only to 24.3 g. The pH value of the aqueous layer is 6 which indicates a substantial saponification of the benzoyl chloride used or the benzoic anhydride formed. By precipitating with hydrochloric acid 34.7 g. of benzoic acid can be recovered from the aqueous layer. Upon working up the methylene chloride layer in the manner described above there are obtained 34.9 g. of benzoic anhydride as well as 51.1 of unreacted benzoyl chloride.

Although the invention has been described in considerable detail in the foregoing for the purpose of illustration, it is to be understood that variations can be made by those skilled in the art without departing from the spirit and scope of the invention, except as set forth in the claims.

What is claimed is:
1. In the preparation of organic carbonic and carboxylic acid derivatives from the reaction of one mol of a halide selected from the group consisting of carbonic acid halides and carboxylic acid halides with one mol for each halogen atom that is present in said halide of a compound selected from the group consisting of aliphatic and aromatic hydroxy compounds in the presence of water, an amount of a basic reactant selected from the group consisting of alkali metal and alkaline earth metal hydroxides and alkali metal and alkaline earth metal carbonates which is at least chemically equivalent to the amount of hydrogen halide formed during the reaction, an inert organic water immiscible solvent for said halides and a catalytic amount of a tertiary amine or quaternization product thereof, the improvement which comprises conducting the reaction in the presence of at least 0.00025 mol percent based on the halide of a catalyst selected from the group consisting of a tertiary amine and a quaternary ammonium halide thereof, having the formula

wherein at least one of the substituents, $R_1$, $R_2$ and $R_3$ is selected from the group consisting of $\omega$-hydroxyalkyl, $\omega$-hydroxyalkyl ether and $\omega$-hydroxyalkyl polyether, the alkyl radicals having from 2 to 18 carbon atoms and the remaining substituents being hydrocarbon groups having from 1 to 18 carbon atoms.

2. The process of claim 1 wherein the reaction is conducted at a temperature between about $-20°$ C. and about $100°$ C.

3. The process of claim 1 wherein the catalyst is used in an amount of between about 0.0005 to 0.2 mol percent based on the halide.

4. The process of claim 1 wherein the catalyst is an ethoxylated N-methyl-stearylamine.

5. The process of claim 1 wherein the catalyst is obtained from the reaction of 1 mol of N,N-dimethylethanolamine with from 4 to 10 mols of propylene oxide.

6. The process of claim 1 wherein the catalyst is obtained from the reaction of 1 mol of N,N-diisobutylamine, 1 mol of styrene oxide and from 4 to 10 mols of propylene oxide.

7. The process of claim 1 wherein the organic hydroxy compound is obtained by saponification of a portion of the carbonic acid halides and carboxylic acid halides.

8. The process of claim 1 wherein at least one of the substituents is a $\omega$-hydroxy lower alkyl group.

9. The process of claim 1 wherein $R_1$ and $R_2$ is a lower alkyl group and $R_3$ is a $\omega$-hydroxy lower alkyl group.

References Cited
UNITED STATES PATENTS
3,043,800  7/1962  Schnell et al. _____ 260—47

FOREIGN PATENTS
108,328  10/1958  Pakistan.
959,497  3/1957  Germany.
1,101,386  3/1961  Germany.
808,490  2/1959  Great Britain.
843,314  8/1960  Great Britain.

CHARLES B. PARKER, *Primary Examiner.*

FLOYD D. HIGEL, *Assistant Examiner.*